(12) United States Patent
Basballe Sorensen

(10) Patent No.: US 11,438,367 B2
(45) Date of Patent: *Sep. 6, 2022

(54) SYSTEMS AND METHODS FOR EVALUATING AND TRAINING CYBERSECURITY TEAMS

(71) Applicant: Christian Lee Basballe Sorensen, Cincinnati, OH (US)

(72) Inventor: Christian Lee Basballe Sorensen, Arlington, VA (US)

(73) Assignee: SightGain Inc., Mason, OH (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/024,744

(22) Filed: Sep. 18, 2020

(65) Prior Publication Data
US 2021/0006584 A1    Jan. 7, 2021

Related U.S. Application Data

(63) Continuation-in-part of application No. 16/888,666, filed on May 30, 2020, now Pat. No. 11,368,480.

(60) Provisional application No. 62/853,767, filed on May 29, 2019.

(51) Int. Cl.
  *H04L 9/40*   (2022.01)
  *G06Q 10/06*  (2012.01)
  *G06Q 10/10*  (2012.01)

(52) U.S. Cl.
  CPC ...  *H04L 63/1433* (2013.01); *G06Q 10/06375* (2013.01); *G06Q 10/06398* (2013.01); *G06Q 10/063112* (2013.01); *G06Q 10/105* (2013.01)

(58) Field of Classification Search
  CPC . H04L 63/1433; H04L 63/20; H04L 63/1441; G06F 21/56; G06F 21/577; G06F 2221/034
  See application file for complete search history.

(56) References Cited

U.S. PATENT DOCUMENTS

| | | | |
|---|---|---|---|
| 9,378,364 B1* | 6/2016 | Weast | H04L 63/1433 |
| 9,800,605 B2* | 10/2017 | Baikalov | H04L 63/1433 |
| 2016/0226894 A1* | 8/2016 | Lee | G06N 20/00 |
| 2016/0285907 A1* | 9/2016 | Nguyen | H04L 63/1433 |
| 2018/0324218 A1* | 11/2018 | Xie | H04L 41/12 |
| 2019/0215328 A1* | 7/2019 | Honig | H04L 63/14 |

* cited by examiner

*Primary Examiner* — Ali S Abyaneh

(57) ABSTRACT

Techniques for evaluating and optimizing cybersecurity operations in an organization is disclosed. The method includes the step of providing a first set of threat scenarios to a cybersecurity operations team in a live environment and a second set of scenarios in a static environment. The response of the teams including various parameters associated it such as time taken for responding, strategies used, effectiveness of the response, etc., are recorded. Based on the recorded responses, the method further performs the step of determining overall assessment scores. Upon determining the scores, the method further performs the step of contextualizing the scores based on a plurality of parameters. Based on the contextualized scores, the method provides detailed insights and recommendations related to the performance of cybersecurity teams. Furthermore, the technique recommends modifications in processes and technology related to the cybersecurity infrastructure that directly affects the performance of cybersecurity operations personnel.

17 Claims, 8 Drawing Sheets

INSTRUCTOR VIEW

| TECHNIQUE COVERAGE | COMPOSITE SCORE | COMPLETED TECHNIQUES | TECHNIQUE COVERAGE | BADGES EARNED |
|---|---|---|---|---|
| 0% | 0 → | 121 → | 65% | 3 → |
| No change compared to last week | No change compared to last week | No change compared to last week | No change compared to last week | No change compared to last week |

LIVE FIRE SCENARIOS
0 →
No change compared to last week

LIVE FIRE — GUIDED TRAINING

ADVERSARY COVERAGE (RUSSIA, CHINA, N.KOR, IRAN)
○ BLOCKED  ● GUIDED  — LIVE FIRE

THREAT TACTIC COVERAGE (PARAMETER 1 ... PARAMETER N)
— BLOCKED  — GUIDED
○ INDUSTRY AVG  ● RESP RATE

SUMMARY

ANALYST LEADERBOARD

1 ANALYST 'A' - SCORE 44
2 ANALYST 'B' - SCORE 38

TECHNOLOGY COVERAGE (CLOUD, EMAIL, ENDPOINT, DLP)
○ BLOCKED  ● GUIDED  — LIVE FIRE

INSTRUCTOR VIEW

| LIVE FIRE SCENARIOS | TECHNIQUE COVERAGE | COMPOSITE SCORE | COMPLETED TECHNIQUES | TECHNIQUE COVERAGE | BADGES EARNED |
|---|---|---|---|---|---|
| 0 → | 0% | 0 → | 121 → | 65% | 3 → |
| No change compared to last week | No change compared to last week | No change compared to last week | No change compared to last week | No change compared to last week | No change compared to last week |

SUMMARY — LIVE FIRE — <u>GUIDED TRAINING</u>

TRAINING COMPLETION BY STUDENT

LIVE FIRE SCORES BY TACTIC

PARAMETER A  PARAMETER B  PARAMETER C  PARAMETER D

○ STUDENT A   ● STUDENT B

○ COMP SCORE   --- PREC SCORE
● TIMELINESS   — EVENT SCORE

TRAINING PROFILES

PROFILE AND RELATED DETAILS

SYSTEMS AND METHODS FOR EVALUATING AND TRAINING CYBERSECURITY TEAMS

CROSS-REFERENCE TO RELATED APPLICATIONS

This application is a continuation-in-part of U.S. Non-Provisional application Ser. No. 16/888,666, entitled "Systems and methods for automated detection of cybersecurity performance gaps", filed May 30, 2020, which claims the benefit of U.S. Provisional Application Ser. No. 62/853,767, entitled "System and software for automating threat based cybersecurity assessments", filed May 29, 2020, which is incorporated herein in its entirety.

TECHNICAL FIELD

The present disclosure is related to the field of cybersecurity. More particularly, the present disclosure is related to methods, techniques, and systems for performing evaluation and training of cybersecurity personnel in an organization.

BACKGROUND

In a highly connected world where almost every business is dependent on the internet for its functioning, cybersecurity becomes an important aspect for smooth functioning of organizations. While conventional brick and mortar businesses invested heavily in physical security at their offices and warehouses, modern businesses that are more reliant on the internet have to take care of both physical security as well as virtual (cyber) security to protect their assets and interests. In computing, cybersecurity or information technology security (IT security) is the protection of computer systems and networks from the theft of or damage to their hardware, software, or electronic data, as well as from the disruption or misdirection of the services they provide. The field of cybersecurity has become more important due to increased reliance on computer systems, the internet, and wireless network standards such as Bluetooth, Near-field Communication (NFC), Wi-Fi, etc. Furthermore, the unprecedented growth of "smart" devices, including smartphones, personal computers, and the various devices that constitute the "Internet of things" has increased the importance of cybersecurity exponentially.

An organization's assets that are connected to the interne face a wide variety of external threats from attackers. The attackers range from individuals inside the organization to groups from hostile government agencies. The types of attacks could range from Denial-of-Service (DoS), direct-access, eavesdropping, multi-vector attacks, phishing, privilege escalation, spoofing, social engineering, tampering, backdoor attacks, and the like.

While solutions such as vulnerability scanning, threat simulation, and cyber reputation have been proposed by prior arts, they fail to meet real world scenarios that consider factors such as practicing against the tactics used by the malicious actors, comprehensively testing the capabilities of cybersecurity processes of an organization, and the like. Solutions that try to rate security capabilities by linking them with compliance may not be adequate since in most of the cases compliance factors do not equate to actual protection against real world threat tactics.

Furthermore, solutions that attempt to assess protection against simulated threat traffic fail to meet the needs of the industry since they often fail to identify the capabilities that are successfully or unsuccessfully participating in this protection. They also fail to take into account the real-world threats that a customer may most likely face. Other solutions that assess cybersecurity gaps through external observation fail to meet industry needs because they only identify problems after they occur so they cannot prevent them from happening. They fail in comprehensively testing for issues that may be present internally, such solutions fail to identify gaps that could be compromised. While some solutions offer automated testing of cybersecurity technology in an organization, they do not consider the human and process aspects behind the overall system performance. Even if an organization makes large investments in cybersecurity, there may remain significant performance gaps in due to environmental complexity, dynamically changing organizational structures, team structures, and the like. More particularly, the cybersecurity management teams of the organizations, which include personnel handling these threats may be very dynamic and hence they need to be updated, evaluated, and trained on an ongoing basis in regard to effective usage of existing systems as well as keeping updated with newly emerging cybersecurity threat tactics.

Hence, it will be useful to provide a solution that can help organizations identify cybersecurity performance gaps among cybersecurity operations teams in the context of the overall cybersecurity system performance. Further, it will be useful to provide a comprehensive method for evaluating the performance of cybersecurity teams with respect to multiple parameters, reporting these results in an easily understood way, and to provide automated assistance to them to overcome the identified performance gaps.

BRIEF DESCRIPTION OF THE DRAWINGS

FIG. 4 is an exemplary view of a dashboard of an instructor with summarized data depicting various parameters regarding the cybersecurity threat mitigation preparedness of personnel in an organization according to the embodiments of the present disclosure;

FIG. 6 is an exemplary view of a dashboard of an instructor which shows result data related to guided training of cybersecurity personnel in an organization according to the embodiments of the present disclosure;

DETAILED DESCRIPTION

Figure 1:
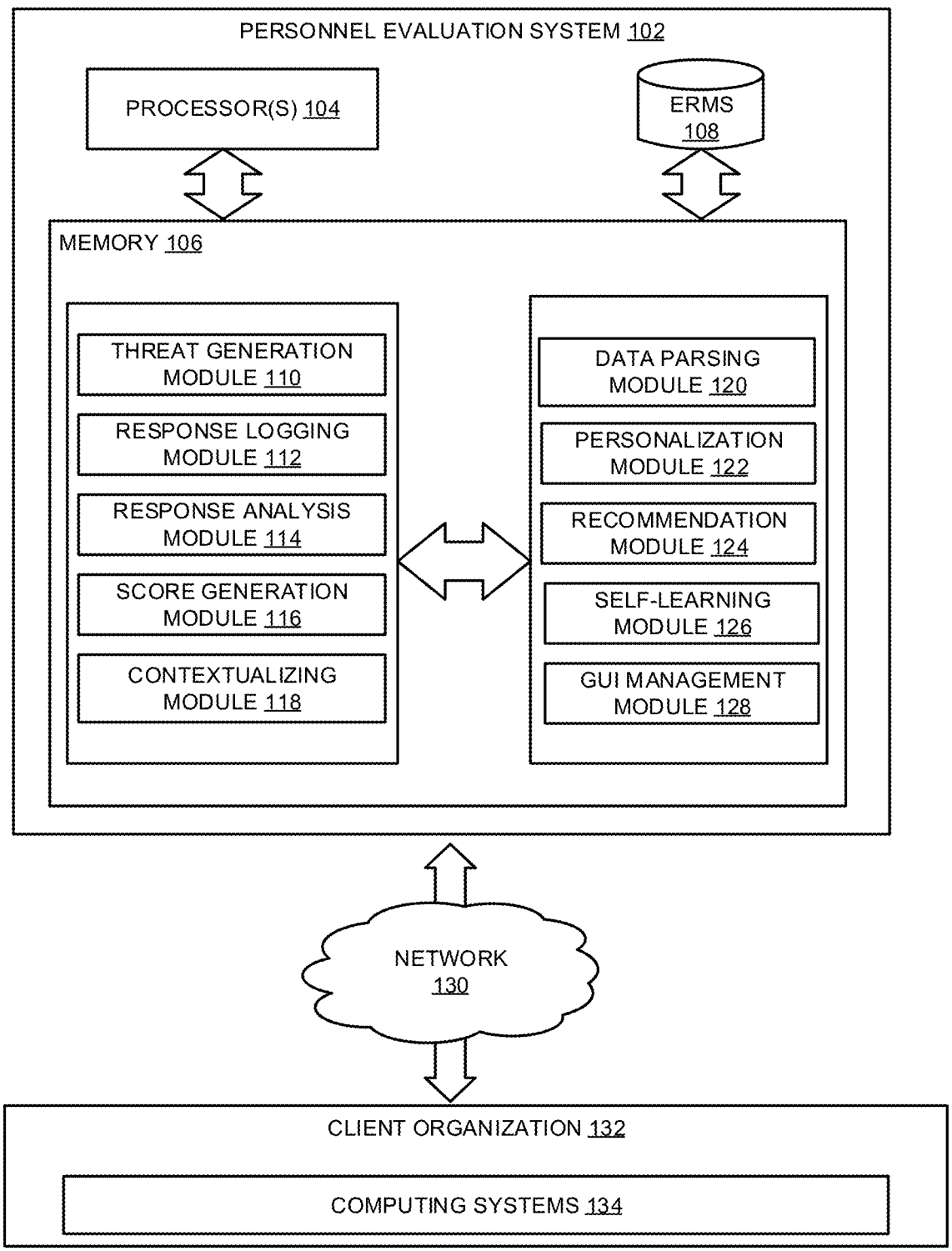
FIG. 1 is a block diagram of the architecture of a personnel evaluation system according to the embodiments of the present disclosure.

Embodiments described herein discloses a computer-implemented method and associated systems for evaluating and training cybersecurity personnel in an organization. The method may be executed by a processor storing one or more instructions. The method comprises the steps of selecting a cybersecurity operations personnel or team in the organization for evaluation and training, providing a first set of threat scenarios to the cybersecurity operations team in a live environment, recording one or more tactics used by the cybersecurity operations team in response to the first set of threat scenarios including time taken to determine one or more threat types, time taken to prepare and deploy response tactics to overcome each of the one or more threat types, ability to identify the type of malicious activity, and effectiveness scoring of the response tactics in overcoming each of the one or more threat types. Further, the method comprises the steps of providing a second set of training scenarios to the cybersecurity operations team in a static environment including a plurality of questions related to one or more threat types and associated response tactics and recording the plurality of responses provided by the cybersecurity operations team in response to the second set of scenarios. Based on the recorded responses from the live environment tests and the static environment tests, the method further performs the step of determining overall personnel and team assessment scores. Upon determining the scores, the method further performs the step of contextualizing the personnel assessment scores based on one or more parameters including impact, execution, persistence, privilege escalation, defensive evasion, credential access, discovery, lateral movement, collection, command and control, and exfiltration. Furthermore, the method performs the step of providing automated recommendations to improve performance of cybersecurity personnel and cybersecurity system performance in the organization based on the contextualized personnel assessment scores and the contributing factors.

In the foregoing sections, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

In the present disclosure, the term cybersecurity personnel refers to individual(s) who may be operating and managing the cybersecurity systems of an organization. The term cybersecurity personnel may either be considered as a singular term referring to a single cybersecurity analyst or as a plural term referring to more than one analysts (a team of analysts) handling the cybersecurity systems of the organization. In the foregoing sections of this document, the cybersecurity personnel/analysts may also be referred to as "students" for the purpose of illustration. Similarly, the individual(s) or the computing system carrying out the evaluation and training process maybe referred to as an "instructor" for the purpose of illustration. In the present disclosure, an instructor may include one or more cybersecurity experts who may use the personnel evaluation system to evaluate and train the students within an organization or the instructor function may be automated to quickly assess personnel skills without further instruction.

FIG. 1 is a block diagram 100 of the architecture of a personnel evaluation system 102 connected to a client organization 132 having one or more computing systems 134 via a network 130. As shown in FIG. 1, the personnel evaluation system 102 may include processor(s) 104 and memory 106 that are communicatively coupled to each other. Further, the personnel evaluation system 102 may include an enterprise repository management system (ERMS) 108 that may be communicatively connected to the memory 106. Furthermore, as shown in FIG. 1, memory 106 may include a threat generation module 110, a response logging module 112, a response analysis module 114, a score generation module 116, a contextualizing module 118, a data parsing module 120, a personalization module 122, a recommendation module 124, a self-learning module 126, and a GUI management module 128.

Components of the personnel evaluation system 102 may be any combination of hardware and programming to implement the functionalities described herein. In some implementations, the programming may be processor 104 executable instructions stored on a non-transitory machine-readable storage medium (e.g., memory 106), and the hardware may include at least one processing resource to retrieve and/or execute those instructions. Processor(s) 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor (s) 104 thus may also include the functionality to encode messages and/or data or information. Processor(s) 104 may include, among other things, a clock, an arithmetic logic unit (ALU) and logic gates configured to support operation of processor(s) 104. Further, the processor(s) 104 may include functionality to execute one or more software programs, which may be stored in the memory 106 or otherwise accessible to processor(s) 104.

Memory 106, may store any number of pieces of information, and data, used by the system to implement the functions of the system. The memory 106 may include, for example, volatile memory and/or non-volatile memory. Examples of volatile memory may include but are not limited to volatile random-access memory (RAM). The non-volatile memory may additionally or alternatively comprise an electrically erasable programmable read only memory (EEPROM), flash memory, hard drive, and the like. Some examples of the volatile memory include, but are not limited to, dynamic RAM, static RAM, and the like. Some example of the non-volatile memory includes, but are not limited to, hard disks, magnetic tapes, optical disks, programmable read only memory, erasable programmable read only memory, electrically erasable programmable read only memory, flash memory, and the like. Memory 106 may be configured to store information, data, applications, instructions or the like for enabling the system to carry out various functions in accordance with various example embodiments. Additionally, or alternatively, the memory 106 may be configured to store instructions which when executed by processor(s) 104 causes the threat detection and recommendation system 102 to behave in a manner as described in various embodiments.

In one implementation, the network 130 may be a wireless network, a wired network or a combination thereof. The network 130 may be implemented as one of the several types of networks, such as intranet, local area network (LAN), wide area network (WAN), the internet, and the like. The network 130 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 130 may include a variety of network devices, including routers, bridges, servers, computing devices, storage devices, and the like.

During operation, the threat generation module 110 may aid in selecting a threat scenario that may be provided to the cybersecurity personnel during evaluation and training. The threat scenario may be automatically selected depending on the profile of the organization and the cybersecurity team or manually selected by an instructor. The selected threat scenario may be a pre-existing threat scenario or may be newly created. Threat types and client nodes onto which the attack is to be targeted may be selected manually or automatically by the personnel evaluation system 102 via the threat generation module 110. The response logging module 112 records the actions provided by the cybersecurity personnel in response to a threat scenario. The response logging module 112 is responsible for recording the actions performed by the personnel in response to the first set of scenarios as well as the second set of scenarios. Herein, the first set of scenarios may include tests conducted in a live environment (referred to as 'live fire' in the drawings) wherein the live environment may be a production environment. The personnel evaluation system may automatically generate test scenarios that may be provided in a live environment or may allow instructors to generate and provide the test scenarios to the personnel. Exemplary test scenarios may include known cybersecurity attack scenarios such as phishing attacks, web shell attacks (eg: china chopper), click fraud tactics, ransomware, different types of host compromise attacks, backdoor entry attacks, and other forms of vulnerability exploitation as understood by a person skilled in the art. The personnel evaluation system may further determine the attacker node and the target node wherein the attacker/target node may comprise at least one of server actor, DMZ actor, critical server actor, internal actor, desktop actor, protected theatre, Win7, WinPT, and the like. Alternatively, the threat generation module 110 may also create custom threat scenarios from scratch as well. The personnel evaluation system may further select one or more cybersecurity analysts for evaluation and training. The threat generation module 110 may also provide evaluation and training in a static environment (referred to as guided training in the drawings) apart from providing evaluation/training in the live production environment. Herein, the guided training mode may allow the personnel to answer objective as well as subjective questions related to a plurality of cybersecurity threats, responding tactics, strategies, configurations, and the like. The response logging module may record every answer/response provided by the personnel in response to the first and second set of scenarios. The response analysis module 114 allows the personnel evaluation system to quantify the responses logged by the response logging module 112. The actions taken by the personnel along with various parameters such as quality of answers provided, the effectiveness of the strategies/tactics used, time taken to provide responses, and the like are considered as parameters. These parameters may be provided with a weight while quantifying the responses by the response analysis module 114.

The score generation module 116 along with the response analysis module 114 generates a set of scores for each cybersecurity analyst in the cybersecurity operations team. Scores may be provided for each cybersecurity analyst, cybersecurity team, and the organization as such. The contextualizing module 118 along with the data parsing module 120 contextualizes the personnel assessment scores generated by the score generation module 116 based on one or more threat tactics including but not limited to impact, execution, persistence, privilege escalation, defensive evasion, credential access, discovery, lateral movement, collection, command and control, and exfiltration. Herein, the abovementioned parameters are taken into account while processing the personnel assessment scores to evaluate the cybersecurity personnel based on various specific parameters to provide a better insight into the strengths and weaknesses of the personnel and supporting technology and processes. The recommendation module 124 recommends one or more actions to improve the performance of the cybersecurity personnel based on the contextualized personnel assessment scores. Herein, the recommendations may include a detailed report that provides the strengths and problem areas of the cybersecurity personnel and the cybersecurity team of an organization as well as the supporting cybersecurity technology and processes. Furthermore, recommendations may include further course of action to train the personnel to overcome their weaknesses and cybersecurity system configuration best suited to provide an optimal cybersecurity protection based on the strengths and weaknesses of the incumbent cybersecurity team. The Graphical User Interface (GUI) module may 128 convert the numerical results to visual representation and presents them in a configurable dynamic dashboard.

Figure 2:
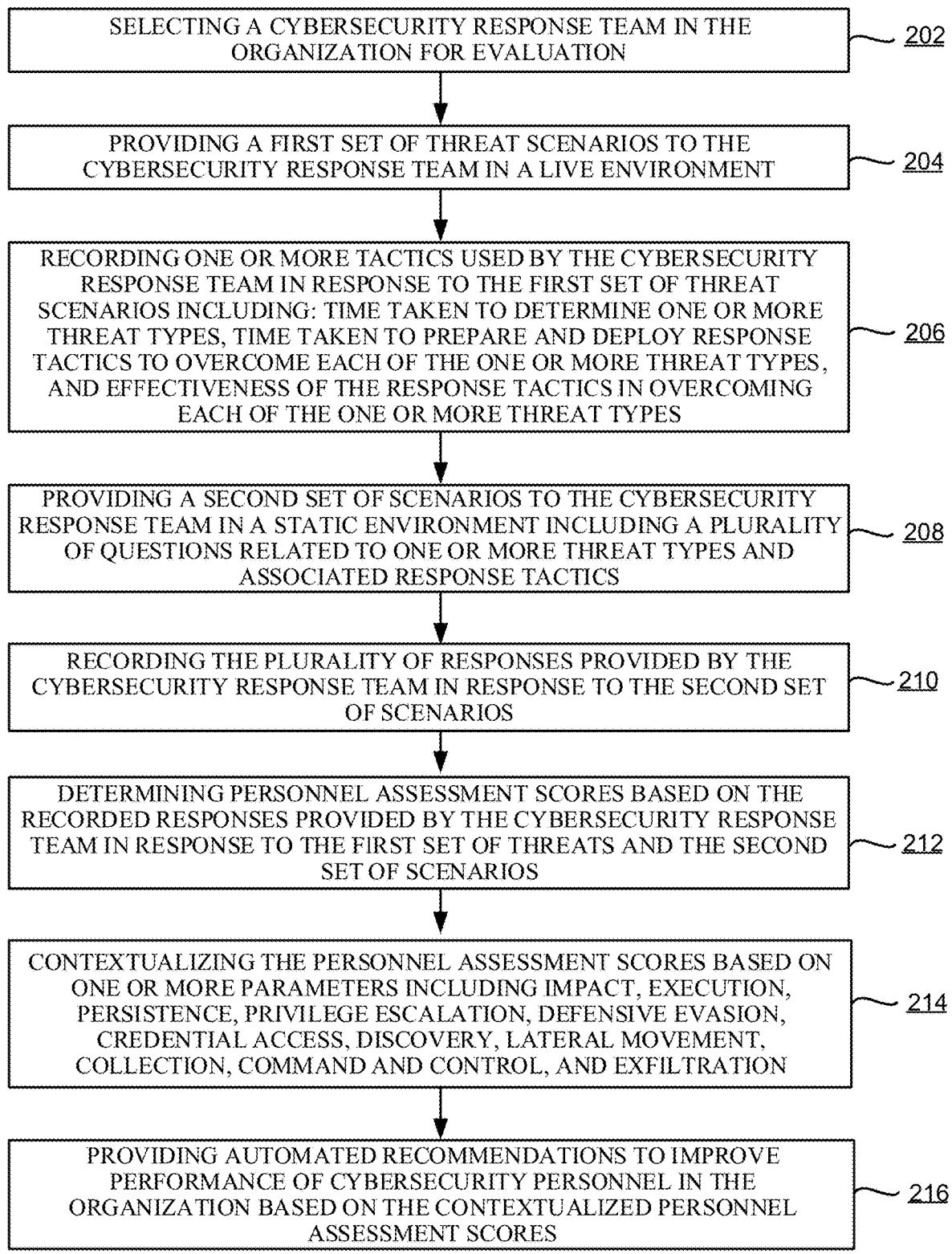
FIG. 2 is an example flow diagram of a method for evaluating preparedness in dealing with cybersecurity threats among cybersecurity personnel in an organization according to the embodiments of the present disclosure.

FIG. 2 is an example flow diagram 200 of a method for evaluating preparedness in dealing with cybersecurity threats among cybersecurity personnel in an organization. The process depicted in FIG. 2 represents generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

At 202, the method performs the selecting a cybersecurity operations team in the organization for evaluation. At 204, the method performs the step of providing a first set of injecting threat scenarios to the cybersecurity operations team in their live production environment. At 206, the method performs the step of recording one or more tactics used by the cybersecurity operations team in response to the first set of threat scenarios including: time taken to determine one or more threat types, time taken to prepare and deploy response tactics to overcome each of the one or more threat types, and effectiveness of the response tactics in overcoming each of the one or more threat types. At 208, the method performs the step of providing a second set of scenarios to the cybersecurity operations team in a static environment including a plurality of questions related to one or more threat types and associated response tactics. At 210, the method performs the step of recording the plurality of responses provided by the cybersecurity operations team in response to the second set of scenarios. At 212, the method performs the step of determining personnel assessment scores based on the recorded responses from the cybersecurity operations team in response to the first set of threats and the second set of scenarios. At 214, the method performs the step of contextualizing the personnel assessment scores based on one or more performance parameters including impact, execution, persistence, privilege escalation, defensive evasion, credential access, discovery, lateral movement, collection, command and control, and exfiltration. At 216, the method performs the step providing automated recommendations to improve performance of cybersecurity personnel in the organization based on the contextualized personnel assessment scores.

Figure 3:
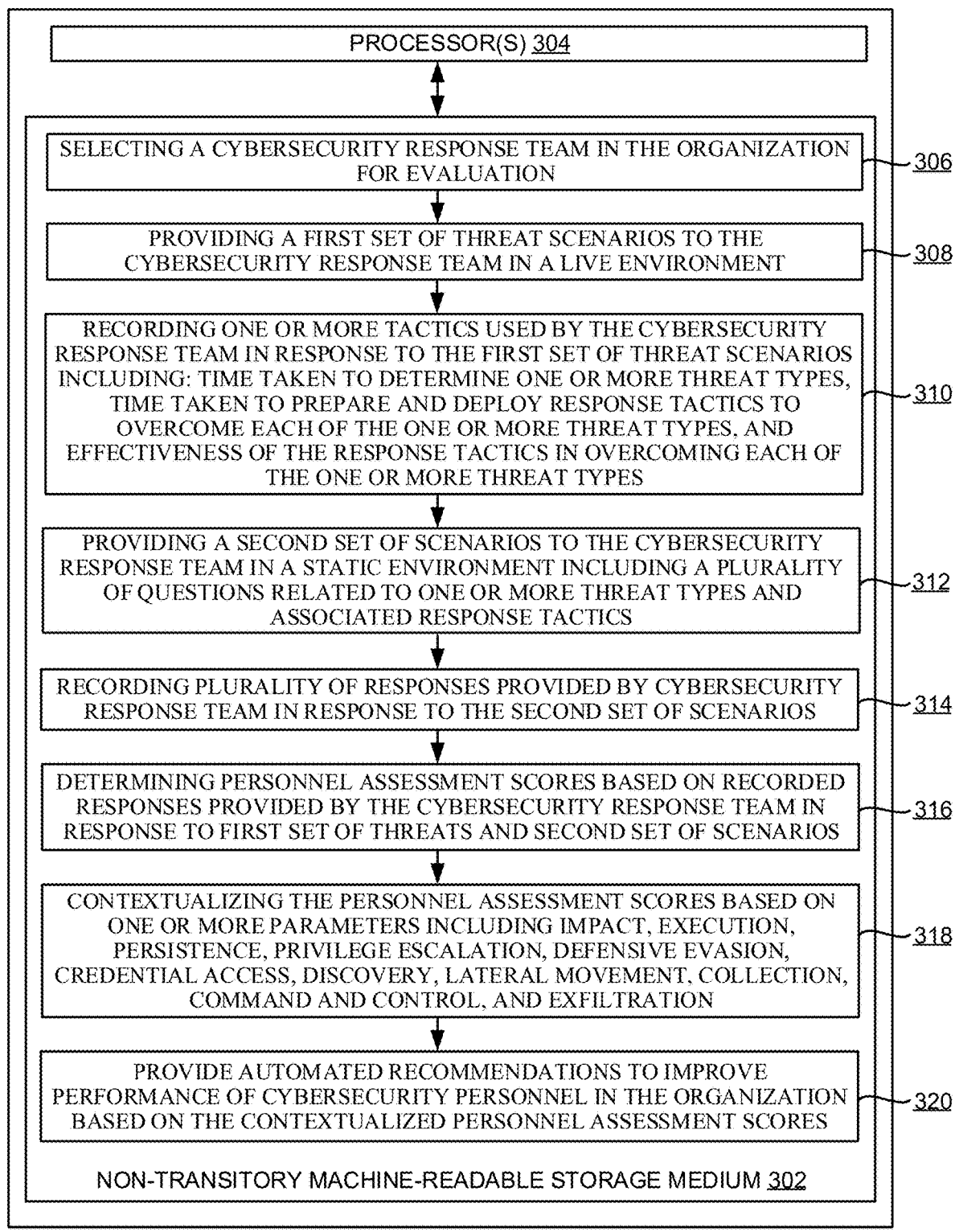
FIG. 3 is a block diagram of an example machine-readable storage medium storing instructions for evaluating preparedness in dealing with cybersecurity threats among cybersecurity personnel in an organization according to the embodiments of the present disclosure.

FIG. 3 is a block diagram 300 of an example computing system including instructions stored in a machine-readable storage medium 302 for mitigating cybersecurity performance gaps in an organization. The computing system 300 may include a processor(s) 304 and a non-transitory machine-readable storage medium 302 communicatively coupled through a system bus. The processor 304 may be any type of central processing unit (CPU), microprocessor, or processing logic that interprets and executes machine-readable instructions stored in the machine-readable storage medium 302. The machine-readable storage medium 302 may be a random-access memory (RAM) or another type of dynamic storage device that may store information and machine-readable instructions that may be executed by the processor 304. For example, the machine-readable storage medium 302 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 302 may be a non-transitory machine-readable medium. In an example, the machine-readable storage medium 302 may be remote but accessible to computing system 300.

At 306, the machine-readable storage medium instructs the system to select a cybersecurity operations team in the organization for evaluation. At 308, the machine-readable storage medium instructs the system to provide a first set of threat scenarios to the cybersecurity operations team in a live environment. At 310, the machine-readable storage medium instructs the system to record one or more tactics used by the cybersecurity operations team in response to the first set of threat scenarios including: time taken to determine one or more threat types, time taken to prepare and deploy response tactics to overcome each of the one or more threat types, and effectiveness of the response tactics in overcoming each of the one or more threat types. At 312, the machine-readable storage medium instructs the system to provide a second set of scenarios to the cybersecurity operations team in a static environment including a plurality of questions related to one or more threat types and associated response tactics. At 314, the machine-readable storage medium instructs the system to record the plurality of responses provided by the cybersecurity operations team in response to the second set of scenarios. At 316, the machine-readable storage medium instructs the system to determine personnel assessment scores based on the recorded responses provided by the cybersecurity operations team in response to the first set of threats and the second set of scenarios. At 318, the machine-readable storage medium instructs the system to contextualize the personnel assessment scores based on one or more parameters including impact, execution, persistence, privilege escalation, defensive evasion, credential access, discovery, lateral movement, collection, command and control, and exfiltration. At 320, the machine-readable storage medium instructs the system to provide automated recommendations to improve performance of cybersecurity operations personnel in the organization based on the contextualized personnel assessment scores.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

In one example, the cybersecurity operations team comprises one or more cybersecurity operations personnel associated with the organization. The personnel evaluation system and method disclosed herein may allow evaluation and training of personnel ranging from individual cybersecurity analyst in the organization, a team of analysts in the organization, or the overall cybersecurity team of the organization. Furthermore, the step of contextualizing the personnel assessment scores comprise transforming the personnel assessment scores into data categories such as alert, detect, and protect. Herein, the alert data is related to cybersecurity performance alerts that are to be sent for alerting probable threat activities, detect data is related to cybersecurity threats that are identified, and protect data is related to cybersecurity threats that were blocked by the cybersecurity team.

In one example, the automated recommendations provided herein assists the cybersecurity team to improve their performance using reports generated by the personnel evaluation system that include information related to the performance of each cybersecurity personnel in the cybersecurity team and optimized cybersecurity configuration to reduce cybersecurity performance gaps in the organization and the cybersecurity team.

Furthermore, the present disclosure may provide assessment plans for the students with specific objectives for improving the performance of the students in one or more areas of cybersecurity. Herein, the instructors may be allowed to provide tailor-made assessment plans for students of each organization depending on their cybersecurity requirements. One or more strategies may be generated for assessment and the instructor may have the ability to switch strategies or revert to different plans if one strategy/plan does not attain the objectives as expected. That is, a version control may be provided for evaluation and training to maintain positive configuration management of the assessment plan, its release state, and revert back to a previous plan if necessary. The assessment plans may be automatically generated by the personnel evaluation system depending on the requirements of the organization. The generated assessment plans may be customized by the instructors as well. Alternatively, the assessment plans may be wholly generated by the instructors using the personnel evaluation system using an easy assessment plan generation wizard that may be provided by the personnel evaluation system 102. Herein, the assessment plan generation wizard may comprise a plurality of questions and options provided to the instructor in a dialogue box format by the GUI module. Depending upon the options selected by the instructor while parsing through the plurality of questions presented in the plan generation wizard, assessment plans may be generated by the personnel evaluation system 102.

FIG. 4 is an exemplary view 400 of a dashboard of an instructor with summarized data depicting various parameters regarding the cybersecurity operations and threat mitigation preparedness of personnel in an organization. The dashboard may provide a quick visual representation related to various data points related to personnel evaluation and training in real-time. The summary view illustrated in FIG. 4 provides details regarding the overall performance of the cybersecurity team by means of leader boards, technology coverage graphs, threat group coverage graphs, and tactic threat coverage view. Furthermore, a summarized view of the total number of scenarios available, total percentage of technique covered during evaluation/training, composite score, competitive badges earned, and the like may be provided in the dashboard. The personnel evaluation system support gamification and various performance-based outcomes are provided to the instructor and the student via various visual representations provided in the dashboard.

Figure 5:
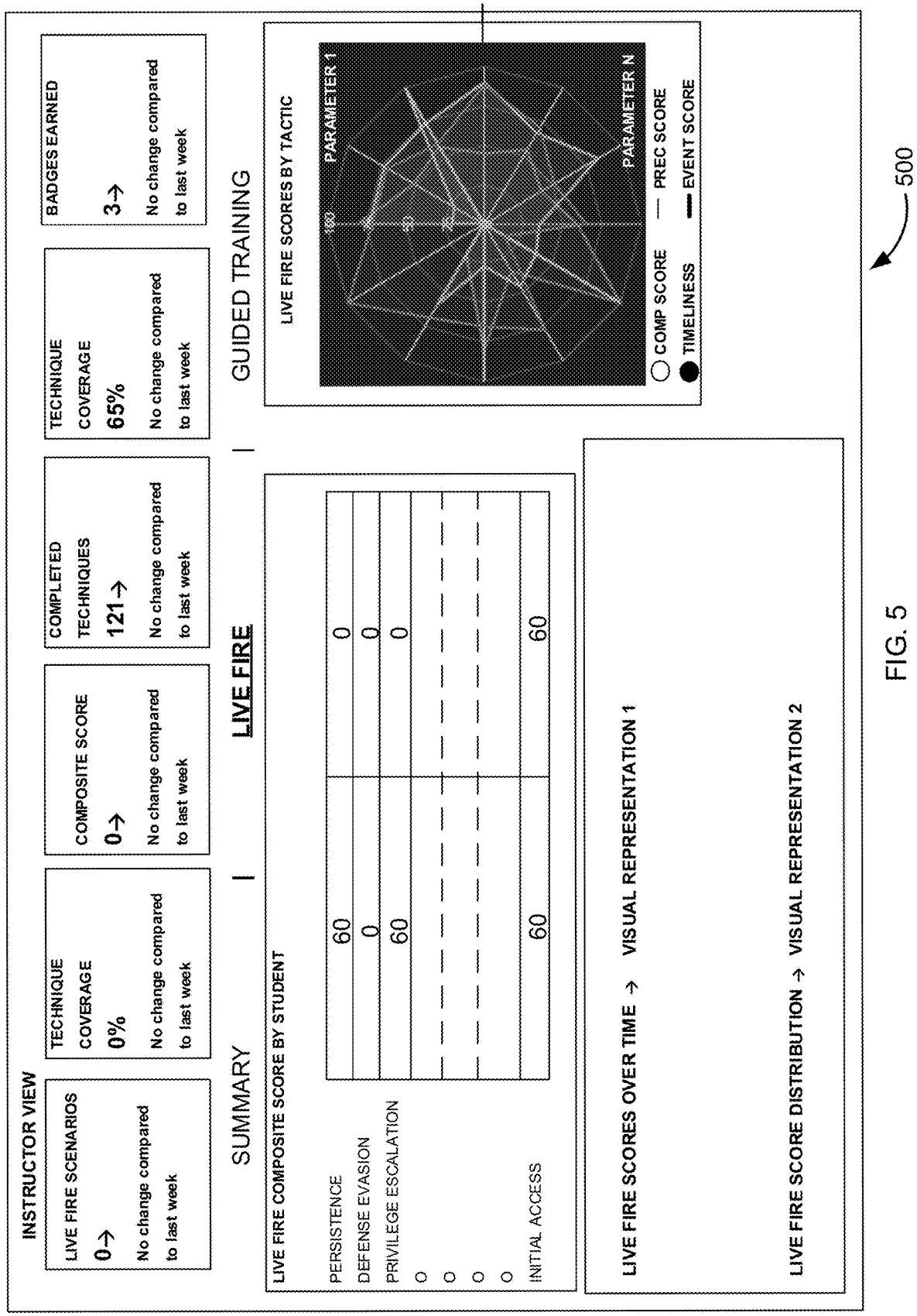
FIG. 5 is an exemplary view of a dashboard of an instructor which shows result data related to live training of cybersecurity personnel in an organization according to the embodiments of the present disclosure.

FIG. 5 is an exemplary view 500 of a dashboard of an instructor which shows result data related to live training of cybersecurity personnel in an organization in real-time. Comparative scores and charts of different students, teams, and personnel may be provided as visual representation via the dashboard. The dashboard provides a dynamic visual representation of contextualized scores and recommendations to the instructor as well as the student in real-time. Historical performance measures and trending will also be available. FIG. 6 is an exemplary view 600 of a dashboard of an instructor which shows result data related to guided training of cybersecurity personnel in an organization in real-time. Results related to the second set of scenarios (guided training) may be represented in a separate dashboard as illustrated herein. The personnel evaluation system may further create profiles for each student/team/organization to generate and provide tests of different levels of difficulty dynamically. The self-learning module 126 of the personnel evaluation system learns user behaviour over time to generate such intelligent user profiles and tests to allow the instructors as well as the students to improve their performance over time by participating in personalized tests and trainings.

Figure 7:
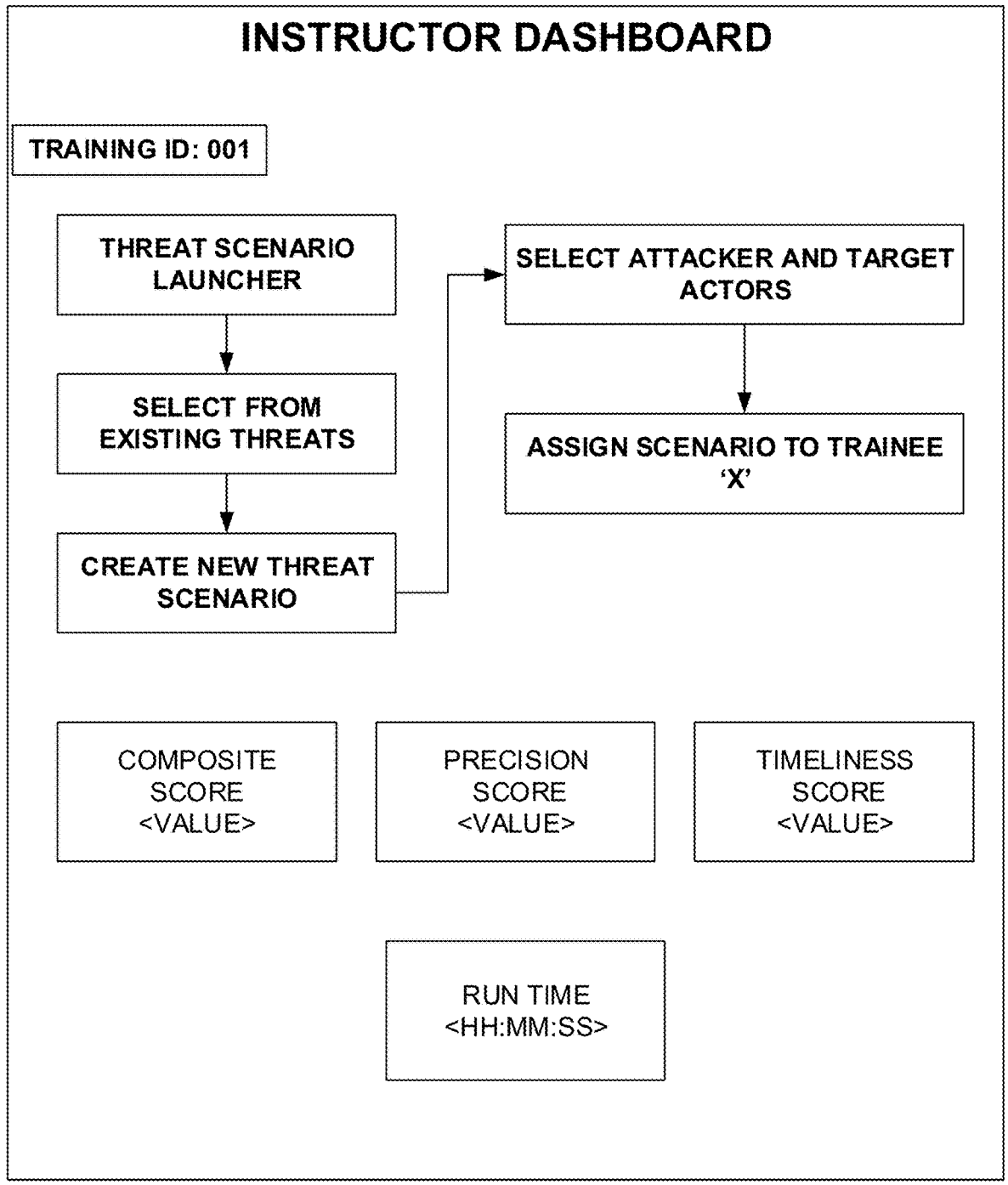
FIG. 7 is an exemplary process flow dashboard of the instructor performing evaluation and training of cybersecurity personnel in an organization according to the embodiments of the present disclosure.
Figure 8:
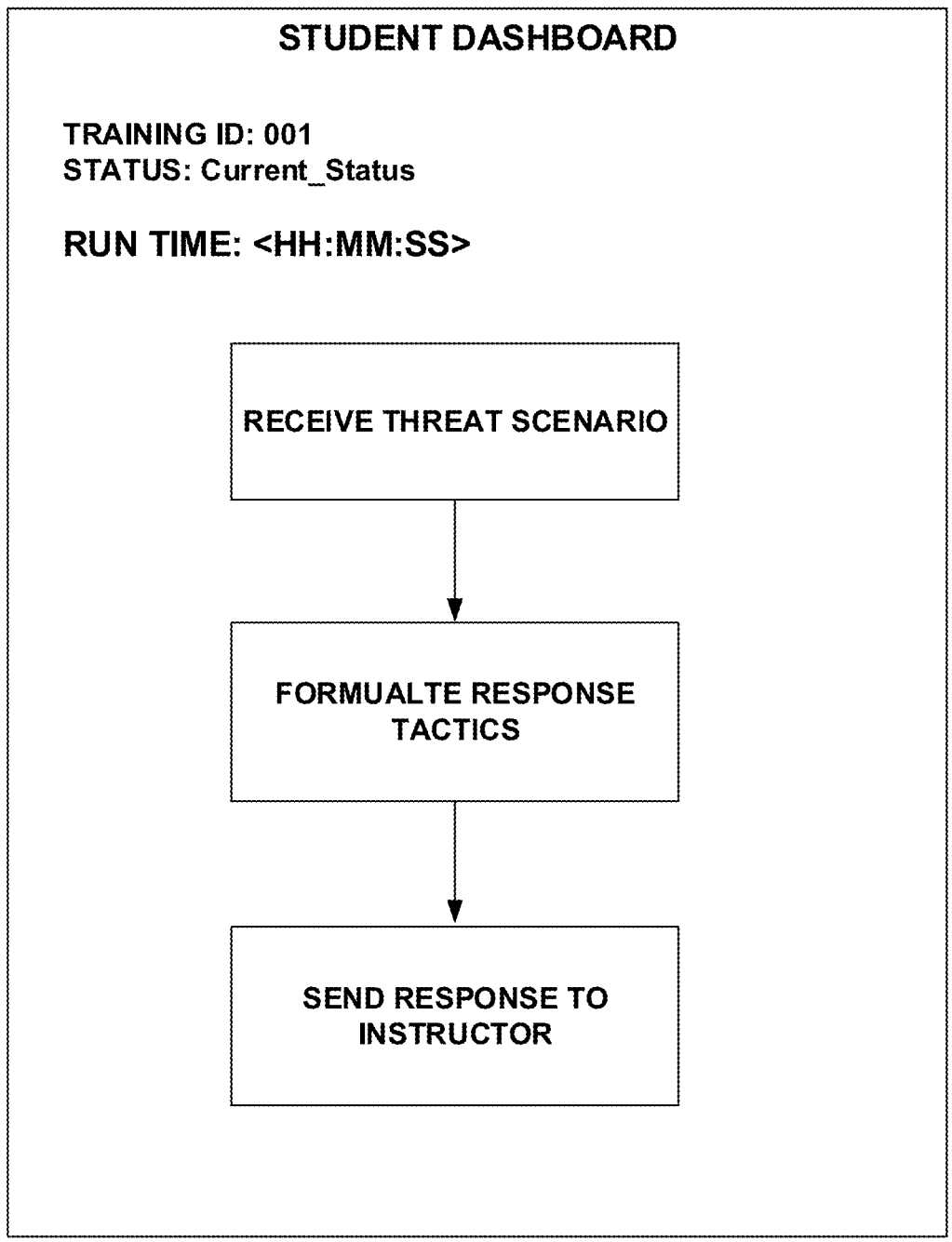
FIG. 8 is an exemplary process flow dashboard of a cybersecurity personnel taking part in performance evaluation and training according to the embodiments of the present disclosure.

FIG. 7 is an exemplary process flow dashboard 700 of the instructor performing evaluation and training of cybersecurity personnel in an organization. Herein, the instructor and the student receive a training ID for each evaluation/training process. Tagging each student, instructor and session to a training ID may allow the self-learning module 126 as well as the recommendation module 124 to improve the process of evaluation, training, scoring, and recommendation over time. Herein, the instructor chooses a threat scenario by selecting from existing threat scenarios or by creating an entirely new threat scenario. The instructor further selects the attacker and target actors and further assigns the scenario to the student/trainee. The threat scenario is then received by the student/personnel. The students may respond to the threat scenario which is logged by the response logging module 112. FIG. 8 is an exemplary process flow dashboard 800 of a cybersecurity personnel taking part in performance evaluation and training. Depending on the response, the present disclosure calculates the performance assessment score provides a composite score, precision score, timeliness score, and runtime to the instructor dashboard 700. In the student dashboard 800 the student receives a threat scenario, formulates response tactics, and finally sends the response to the instructor. It may be noted that the illustrations of the dashboard provided herein are merely exemplary in nature and do not affect the scope of the present subject matter.

In addition to the abovementioned, a recommendation dashboard may further provide the organization with personalized recommendations with respect to the course of actions that may be taken by the organization to overcome gaps with respect to cybersecurity personnel's performance gaps. Furthermore, the recommendation dashboard may provide optimal configuration and recommend specific settings throughout the cybersecurity system to provide optimal security for the cybersecurity infrastructure of the organization depending on the strengths and weaknesses of the cybersecurity teams.

In one example, the present disclosure provides a holistic view regarding personnel performance within a cybersecurity infrastructure by relating personnel performance with that of performance gaps in processes and technology. The present disclosure extends the capability of an organization in identifying cybersecurity performance gaps by providing an extension over the related parent application (U.S. patent application Ser. No. 16/888,666) in specifically tracking personnel performance. Herein, the overall cybersecurity system/infrastructure comprises three primary actors including people, technology, and processes. While the related parent application focusses on identifying cybersecurity performance gaps specifically with respect to processes and technology, the present disclosure focusses more on people in relation to the aforementioned technology and processes. The results of personnel performance identified herein may be related to the performance gaps in processes and technology to identify how technology and processes are inhibiting personnel performance of the overall cybersecurity operations in an organization.

Herein, the one or more gaps in cybersecurity performance with respect to technology or processes may positively or negatively affect personnel performance. Identifying these gaps and relating them to personnel performance may allow an organization to fine tune their cybersecurity operations and infrastructure efficiently. The present disclosure identifies personnel performance in response to adversary tactics in production networks thereby providing real-time results regarding personnel performance. Combining these results along with cybersecurity performance gaps and automated recommendations related to technology and processes allow organizations to determine changes/updates required in processes, technology along with the effects of those changes in personnel preparedness (training) and vice versa.

It maybe noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All the features disclosed in this specification (including any accompanying claims, abstract and drawings), and all of the steps of any method or process so disclosed, may be combined in any combination, except combinations where at least some of such features or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computer-implemented method for evaluating preparedness in dealing with cybersecurity threats among cybersecurity personnel in an organization, comprising:
    selecting a cybersecurity response team in the organization for evaluation;
    after selecting the cybersecurity response team, automatically generating threat scenarios from known security attack scenarios;
    providing a first set of threat scenarios from the generated threat scenarios to the cybersecurity response team in a live environment;
    recording one or more tactics used by the cybersecurity response team in response to the first set of threat scenarios including: time taken to determine one or more threat types, time taken to prepare and deploy response tactics to overcome each of the one or more threat types, and effectiveness of the response tactics in overcoming each of the one or more threat types;
    providing a second set of scenarios from the generated threat scenarios to the cybersecurity response team in a static environment including a plurality of questions related to one or more threat types and associated response tactics;
    recording a plurality of responses provided by the cybersecurity response team in response to the second set of scenarios;
    automatically generating personnel assessment scores based on the recorded responses provided by the cybersecurity response team in response to the first set of threat scenarios and the second set of threat scenarios;
    contextualizing the personnel assessment scores based on parameters including credential access, lateral movement, command and control, and exfiltration;
    converting the contextualized personnel assessment scores to dynamic visual representations; and
    providing automated recommendations in a configurable dynamic dashboard to improve performance of the cybersecurity response team based on the contextualized personnel assessment scores and the dynamic visual representations, wherein the automated recommendations include information related to performance of each cybersecurity personnel in the cybersecurity team and optimized cybersecurity technology and processes to reduce cybersecurity performance gaps in the organization.

2. The computer-implemented method of claim 1, wherein the cybersecurity response team comprises one or more cybersecurity personnel associated with the organization.

3. The computer-implemented method of claim 1, wherein the first set of threat scenarios include predefined threat scenarios, newly created threat scenarios, or a combination of both.

4. The computer-implemented method of claim 1, wherein the live environment where the first set of threat scenarios are provided includes a production environment.

5. The computer-implemented method of claim 1, wherein contextualizing the determined personnel assessment scores further comprises transforming the personnel assessment scores into data categories including alert, detect, and protect.

6. The computer-implemented method of claim 5, wherein alert data is related to cybersecurity performance alerts that are to be sent for alerting probable threat activities, detect data is related to cybersecurity threats that are identified, and protect data is related to cybersecurity threats that were blocked by the cybersecurity response team.

7. A system, comprising:
    at least one processor; and
    at least one non-transitory computer readable storage medium storing instructions thereon that, when executed by the at least one processor, cause the system to:
        select a cybersecurity response team in the organization for evaluation;
        after selecting the cybersecurity response team, automatically generate threat scenarios from known security attack scenarios;
        provide a first set of threat scenarios from the generated threat scenarios to the cybersecurity response team in a live environment;
        record one or more tactics used by the cybersecurity response team in response to the first set of threat scenarios including: time taken to determine one or more threat types, time taken to prepare and deploy response tactics to overcome each of the one or more threat types, and effectiveness of the response tactics in overcoming each of the one or more threat types;
        provide a second set of scenarios from the generated threat scenarios to the cybersecurity response team in a static environment including a plurality of questions related to one or more threat types and associated response tactics;
        record a plurality of responses provided by the cybersecurity response team in response to the second set of scenarios;

determine personnel assessment scores based on the recorded responses provided by the cybersecurity response team in response to the first set of threat scenarios and the second set of scenarios;

contextualize the personnel assessment scores based on parameters including credential access, lateral movement, command and control, and exfiltration;

convert the contextualized personnel assessment scores to dynamic visual representations; and provide automated recommendations in a configurable dynamic dashboard to improve performance of the cybersecurity response team based on the contextualized personnel assessment scores and the dynamic visual representations, wherein the automated recommendations include information related to performance of each cybersecurity personnel in the cybersecurity team and optimized cybersecurity technology and processes to reduce cybersecurity performance gaps in the organization.

8. The system of claim 7, wherein the cybersecurity response team comprises one or more cybersecurity personnel associated with the organization.

9. The system of claim 7, wherein the first set of threat scenarios include predefined threat scenarios, newly created threat scenarios, or a combination of both.

10. The system of claim 7, wherein the live environment where the first set of threat scenarios are provided includes a production environment.

11. The system of claim 7, wherein contextualizing the determined personnel assessment scores further comprises transforming the personnel assessment scores into data categories including alert, detect, and protect.

12. The system of claim 11, wherein alert data is related to cybersecurity performance alerts that are to be sent for alerting probable threat activities, detect data is related to cybersecurity threats that are identified, and protect data is related to cybersecurity threats that were blocked by the cybersecurity response team.

13. A non-transitory computer readable medium storing instructions thereon that, when executed by at least one processor, cause a computer system to:

select a cybersecurity response team in the organization for evaluation;

after selecting the cybersecurity response team, automatically generate threat scenarios from known security attack scenarios;

provide a first set of threat scenarios from the generated threat scenarios to the cybersecurity response team in a live environment;

record one or more tactics used by the cybersecurity response team in response to the first set of threat scenarios including: time taken to determine one or more threat types, time taken to prepare and deploy response tactics to overcome each of the one or more threat types, and effectiveness of the response tactics in overcoming each of the one or more threat types;

provide a second set of scenarios from the generated threat scenarios to the cybersecurity response team in a static environment including a plurality of questions related to one or more threat types and associated response tactics;

record a plurality of responses provided by the cybersecurity response team in response to the second set of scenarios;

determine personnel assessment scores based on the recorded responses provided by the cybersecurity response team in response to the first set of threat scenarios and the second set of scenarios;

contextualize the personnel assessment scores based on parameters including credential access, lateral movement, command and control, and exfiltration;

converting the contextualized personnel assessment scores to dynamic visual representations; and provide automated recommendations in a configurable dynamic dashboard to improve performance of the cybersecurity response team based on the contextualized personnel assessment scores and the dynamic visual representations, wherein the automated recommendations include information related to performance of each cybersecurity personnel in the cybersecurity team and optimized cybersecurity technology and processes to reduce cybersecurity performance gaps in the organization.

14. The non-transitory computer readable medium of claim 13, wherein the first set of threat scenarios include predefined threat scenarios, newly created threat scenarios, or a combination of both.

15. The non-transitory computer readable medium of claim 13, wherein the live environment where the first set of threat scenarios are provided includes a production environment.

16. The non-transitory computer readable medium of claim 13, wherein contextualizing the determined personnel assessment scores further comprises transforming the personnel assessment scores into data categories including alert, detect, and protect.

17. The non-transitory computer readable medium of claim 16, wherein alert data is related to cybersecurity performance alerts that are to be sent for alerting probable threat activities, detect data is related to cybersecurity threats that are identified, and protect data is related to cybersecurity threats that were blocked by the cybersecurity response team.

* * * * *